(12) United States Patent
Cooper

(10) Patent No.: US 7,658,875 B2
(45) Date of Patent: Feb. 9, 2010

(54) BIAXIALLY-ORIENTED METALLOCENE-BASED POLYPROPYLENE FILMS HAVING REDUCED THICKNESS

(75) Inventor: Scott D. Cooper, Humble, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 12/277,619

(22) Filed: Nov. 25, 2008

(65) Prior Publication Data

US 2009/0072432 A1 Mar. 19, 2009

Related U.S. Application Data

(62) Division of application No. 11/656,247, filed on Jan. 22, 2007, now Pat. No. 7,473,751.

(51) Int. Cl.
*B29C 55/02* (2006.01)
*C08J 5/18* (2006.01)
*C08F 210/06* (2006.01)

(52) U.S. Cl. .............. 264/210.1; 264/331.17; 526/126; 526/131; 526/160; 526/348.1

(58) Field of Classification Search .............. 526/348.1, 526/126, 131, 160; 264/210.1, 331.17
See application file for complete search history.

(56) References Cited

U.S. PATENT DOCUMENTS

| | | | | |
|---|---|---|---|---|
| 5,795,946 A | * | 8/1998 | Agarwal et al. | 526/348.1 |
| 6,090,325 A | * | 7/2000 | Wheat et al. | 264/290.2 |
| 2007/0235896 A1 | * | 10/2007 | McLeod et al. | 264/210.7 |

* cited by examiner

*Primary Examiner*—Fred M Teskin
(74) *Attorney, Agent, or Firm*—Diane L. Kilpatrick-Lee

(57) ABSTRACT

A polymer film having a thickness of 10 microns or less and improved barrier characteristics to both water vapor and oxygen is formed from a biaxially-oriented polypropylene film of isotactic polypropylene. The polypropylene is prepared by the polymerization of propylene in the presence of an isospecific metallocene catalyst. The film has a permeability to water vapor of less than about 2.5 $g/m^2$ day/25 μm and a permeability to oxygen of less than about 2200 $cc/m^2$ day/25 μm. The film also has a haze properties of less than about 1%. The polypropylene contains 0.1 to 1% 2,1 insertions and has an isotacticity of at least 96% meso pentads. The isotactic polypropylene thus produced is then extruded into a sheet that is biaxially-oriented by stressing the sheet in the transverse and longitudinal directions to a draw ratio of at least about 6:1 in the transverse direction, and at least about 4:1 in the longitudinal direction.

8 Claims, 2 Drawing Sheets

BIAXIALLY-ORIENTED METALLOCENE-BASED POLYPROPYLENE FILMS HAVING REDUCED THICKNESS

CROSS-REFERENCE TO RELATED APPLICATIONS

This application is a divisional application of U.S. patent application Ser. No. 11/656,247, filed on Jan. 22, 2007, now issued as U.S. Pat. No. 7,473,751.

FIELD OF THE INVENTION

This invention relates to biaxially-orientated polypropylene films, and more particularly to films having a reduced thickness and processes for their preparation from metallocene-based isotactic polypropylene.

BACKGROUND OF THE INVENTION

Isotactic polypropylene is one of a number of crystalline polymers which can be characterized in terms of the stereoregularity of the polymer chain. Various stereo specific structural relationships denominated primarily in terms of syndiotacticity and isotacticity may be involved in the formation of stereoregular polymers from various monomers. Stereospecific propagation may be applied in the polymerization of ethylenically unsaturated monomers such as $C_3+$ alpha olefins, 1-dienes such as 1,3-butadiene, substituted vinyl compounds such as vinyl aromatics, e.g. styrene or vinyl chloride, vinyl chloride, vinyl ethers such as alkyl vinyl ethers, e.g., isobutyl vinyl ether, or even aryl vinyl ethers. Stereospecific polymer propagation is probably of most significance in the production of polypropylene of isotactic or syndiotactic structure.

Isotactic polypropylene is conventionally used in the production of relatively thin films in which the polypropylene is heated and then extruded through dies and subjected to biaxial orientation by stressing the film in both a longitudinal direction (referred to as the machine direction) and in a transverse or lateral direction sometimes referred to as the "tenter" direction. The structure of isotactic polypropylene is characterized in terms of the methyl group attached to the tertiary carbon atoms of the successive propylene monomer units lying on the same side of the main chain of the polymer. That is, the methyl groups are characterized as being all above or below the polymer chain. Isotactic polypropylene can be illustrated by the following chemical formula:

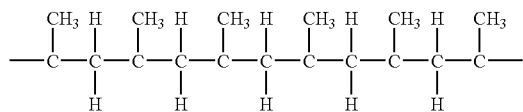

(1)

Stereoregular polymers, such as isotactic and syndiotactic polypropylene can be characterized in terms of the Fisher projection formula. Using the Fisher projection formula, the stereochemical sequence of isotactic polypropylene as shown by formula (2) is described as follows:

(2)

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer. Syndiotactic propylene polymers are those in which the methyl groups attached to the tertiary carbon atoms of successive monomeric units in the polymer chain lie on alternate sides of the plane of the polymer. Using the Fisher projection formula, the structure of syndiotactic polypropylene can be shown as follows:

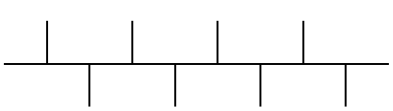

(3)

Syndiotactic polymers are semi-crystalline and, like the isotactic polymers, are insoluble in xylene. This crystallinity distinguishes both syndiotactic and isotactic polymers from an atactic polymer, which is non-crystalline and highly soluble in xylene. An atactic polymer exhibits no regular order of repeating unit configurations in the polymer chain and forms essentially a waxy product.

In most cases, the polymer configuration will be a predominantly isotactic or syndiotactic polymer with very little atactic polymer Catalysts that produce isotactic polyolefins are disclosed in U.S. Pat. Nos. 4,794,096 and 4,975,403. These patents disclose chiral, stereorigid metallocene catalysts that polymerize olefins to form isotactic polymers such as highly isotactic polypropylene.

Metallocene catalysts, such as those described above, can be used either as so-called "neutral metallocenes" in which case an alumoxane, such as methylalumoxane, is used as a co-catalyst, or they can be employed as so-called "cationic metallocenes" which incorporate a stable non-coordinating anion and normally do not require the use of an alumoxane. For example, syndiospecific cationic metallocenes are disclosed in U.S. Pat. No. 5,243,002 to Razavi.

Catalysts employed in the polymerization of alpha-olefins may be characterized as supported catalysts or unsupported catalysts, the later sometimes referred to as homogeneous catalysts. Metallocene catalysts are often employed as unsupported or homogeneous catalysts, although, as described below, they also may be employed in supported catalyst components. Traditional supported catalysts are the so-called "conventional" Ziegler-Natta catalysts, such as titanium tetrachloride supported on an active magnesium dichloride as disclosed, for example, in U.S. Pat. Nos. 4,298,718 and 4,544,717, both to Mayr et al.

While metallocene catalysts are generally proposed for use as homogeneous catalysts, it is also known in the art to provide supported metallocene catalysts. As disclosed in U.S. Pat. Nos. 4,701,432 and 4,808,561, both to Welborn, a metallocene catalyst component may be employed in the form of a supported catalyst. As described in the Welborn '432 patent, the support may be any support such as talc, an inorganic oxide, or a resinous support material such as a polyolefin. Specific inorganic oxides include silica and alumina, used alone or in combination with other inorganic oxides such as magnesia, zirconia and the like. The Welborn '561 patent discloses a heterogeneous catalyst which is formed by the reaction of a metallocene and an alumoxane in combination with the support material. A catalyst system embodying both a homogeneous metallocene component and a heterogeneous component, is disclosed in U.S. Pat. No. 5,242,876 to Shamshoum et al., Various other catalyst systems involving supported metallocene catalysts are disclosed in U.S. Pat. No. 5,308,811 to Suga et al. and U.S. Pat. No. 5,444,134 to Matsumoto.

Processes for the preparation of biaxially-oriented polypropylene films employing polymers produced by the use of isospecific metallocenes involving di- or tri-substituted indenyl groups are disclosed in Canadian Patent Application No. 2,178,104. Four isotactic polymers disclosed there were based upon the polymerization of propylene in the presence of heavily substituted bis(indenyl)ligand structures. In each case, the metallocene used was a silicon-bridged di- or tri-substituted bis(indenyl)zirconium dichloride.

SUMMARY OF THE INVENTION

In accordance with the present invention there is provided a polymer film product of a polypropylene film formed from isotactic polypropylene. The isotactic polypropylene is prepared by the polymerization of propylene in the presence of an isospecific metallocene catalyst. The polymer film is biaxially oriented and has a thickness of about 10 microns or less. The polymer film has a permeability to water vapor of less than about 2.5 g/m$^2$ day/25 µm and permeability to O$_2$ of less than about 2200 cc/m$^2$ day/25 µm. In one embodiment of the invention the polypropylene film has haze properties of less than about 1%. The polypropylene film may be oriented in the transverse direction to a draw ratio of at least about 6:1 and may be oriented in the longitudinal direction to a draw ratio of at least about 4:1 and may have a secant modulus in the longitudinal direction of greater than about 1400 MPa and a secant modulus in the transverse direction of greater than about 2200 MPa.

Additionally, the polypropylene polymer used in forming the polypropylene film may be formed from an isospecific metallocene catalyst characterized by the formula

$$R''(C_5(R')_4)_2MeQ_p \qquad (5)$$

wherein each (C$_5$(R')$_4$) is a substituted cyclopentadienyl ring, each R' is the same or different and is a hydrogen or hydrocarbyl radical having 1-20 carbon atoms, R" is a structural bridge between the two (C$_5$(R')$_4$) rings imparting stereorigidity to the catalyst with the two (C$_5$(R')$_4$) rings being in a racemic configuration relative to Me, and R" is selected from the group consisting of an alkylene radical having 1-4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b or 6b metal as designated in the Periodic Table of Elements. More specifically, Me is titanium, zirconium, hafnium or vanadium; each Q is a hydrocarbyl radical having 1-20 carbon atoms or is a halogen; and $0 \leq p \leq 3$. The isotactic polypropylene used in forming the polypropylene film may be further characterized by having a meso pentad content of greater than about 96%, 2,1-insertions of about 0.1 to 1%, a xylene solubles of less than about 1% by weight of polypropylene, and a melt flow rate of between about 1 to 15 g/10 min.

In a further aspect of the invention, there is provided a process for the production of biaxially-oriented polypropylene film. In the process of the present invention there is provided an isotactic propylene polymer produced by the polymerization of propylene in the presence of a metallocene catalyst characterized by formula (5) above. The extruded sheet is stressed in the transverse and longitudinal directions to form a biaxially-oriented film having a thickness of about 10 microns or less. The polymer film has a permeability to water vapor of less than about 2.5 g/m$^2$ day/25 µm and a permeability to O$_2$ of less than about 2200 cc/m$^2$ day/25 µm. In one embodiment, the polypropylene film may have haze properties of less than about 1%. The polypropylene film may be oriented in the transverse direction to a draw ratio of at least 6:1 and may be oriented in the longitudinal direction to a draw ratio of at least 4:1. The isotactic polypropylene used in forming the polypropylene film may be further characterized by having a meso pentad content of greater than about 96%, 2,1-insertions of less than about 1%, a xylene solubles in the amount of between 0.1 to 1% by weight of polypropylene, and a melt flow rate ranging from about 1 to 15 g/10 min.

DETAILED DESCRIPTION OF THE INVENTION

The biaxially-oriented films of the present invention are characterized in terms of certain well-defined characteristics relating to their stereoregular structures and physical properties, including melt temperatures, as well as in relatively low coefficients of friction and relatively high tensile moduli and relatively low permeation rates to oxygen and water. The biaxially-oriented films of the present invention are formed using a particularly configured polyolefin polymer as described in greater detail below and by using any suitable oriented film production technique, such as the conventionally-used tenter frame process.

In general, such biaxially-oriented film production can be of any suitable technique, such as disclosed in the aforementioned Canadian Patent Application No. 2,178,104 to Peiffer et al. As described in the Peiffer et al application, the polymer or polymers used to make the film are melted and then passed through an extruder to a slot die mechanism after which it is passed over a first roller, characterized as a chill roller, which tends to solidify the film. The film is then oriented by stressing it in a longitudinal direction, characterized as the machine direction, and in a transverse direction to arrive at a film which can be characterized in terms of orientation ratios, sometimes also referred to as stretch ratios, in both longitudinal and transverse directions. The machine direction orientation is accomplished through the use of two sequentially disposed rollers, the second or fast roller operating at a speed in relation to the slower roller corresponding to the desired orientation ratio. This may alternatively be accomplished through a series of rollers with increasing speeds, sometimes with additional intermediate rollers for temperature control and other functions. After the film has been stressed in the machine direction, it is again cooled and then pre-heated and passed into a lateral stressing section, for example, a tenter frame mechanism, where it is again stressed, this time in the transverse direction. Orientation in the transverse direction is often followed by an annealing section. Subsequently, the film is then cooled and may be subjected to further treatment, such as corona treatment or flame treatment, as described, for example, in the aforementioned Canadian Patent Application No. 2178104 or in U.S. Pat. No. 4,029,876 to Beatty, the entire disclosures of which are incorporated herein by reference. The film may also be metallized as described in U.S. Pat. No. 4,692,380 to Reid, the entire disclosure of which is incorporated herein by reference. While corolla and flame treatment typically occur immediately following orientation and prior to the initial roll up, metallizing is typically performed at a separate time and location.

Figure 1:
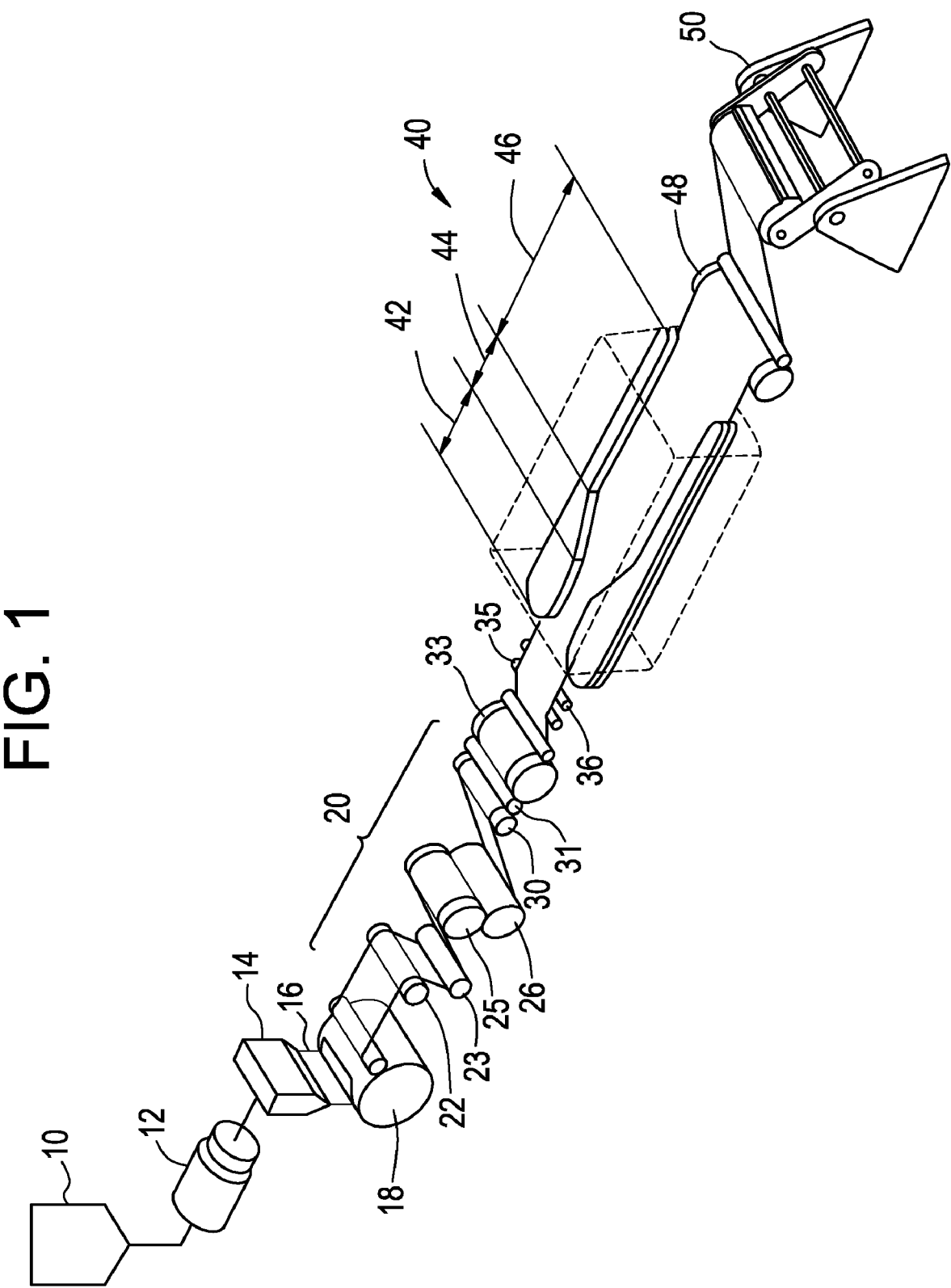
FIG. 1 is a schematic illustration in isometric view of a tenter frame system which may be employed in carrying out the present invention.

Turning now to FIG. 1, there is shown a schematic illustration of a suitable "Tenter Frame" orientation process pilot line which may be employed in producing biaxially-oriented polypropylene film in accordance with the present invention. More particularly and with reference to FIG. 1, a source of molten polymer is supplied from a hopper 10 to an extruder 12 and from there to a slot die 14 which produces a flat, relatively thick film or sheet 16 at its output. The isotactic polypropylene is extruded in a sheet, which may have a thickness of from about 160 to 400 microns. This thickness may vary, however, depending upon the particular draw ratios used and the desired final thickness. Sheet 16 is applied over a chill roller 18, and it is cooled to a suitable temperature within the range of about 30-60° C. The film is drawn off the chill roller 18 to a stretching section 20 in which the machine direction orientation occurs by means of idler rollers 22 and 23 which lead to preheat rollers 25 and 26.

As the film is drawn off the chill roller 18 and passed over the idler rollers 22 and 23, it is cooled to a temperature of about 30-60° C. In stretching the film in the machine direction, it is heated by preheat rollers 25 and 26, which incrementally increase the temperature to about 110-140° C. and then passed to the slow roller 30 of the longitudinal orienting mechanism. The slow roller 30 may be operated at any suitable speed, usually about 20-40 feet per minute. The fast roller 31 is operated at a suitable speed, typically about 150 feet per minute, to provide a surface speed at the circumference of about 4-7 times that of the slow roller 30 in order to orient the film in the machine direction.

As the oriented film is withdrawn from the fast roller, it is passed over roller 33 at room temperature conditions. From there it is passed over tandem idler rollers 35 and 36 to a lateral stretching section 40 where the film is oriented by stretching in the transverse direction. The section 40 includes a preheat section 42 comprising a plurality of tandem heating rollers (not shown) where it is again reheated to a temperature within the range of 110-180° C. From the preheat section 42 of the tenter frame, the film is passed to a stretching or draw section 44 where it is progressively stretched by means of tenter clips (not shown) which grasp the opposed sides of the film and progressively stretch it laterally until it reaches its maximum lateral dimension. Lateral stretching ratios are typically greater than machine direction stretch ratios and often may range from 5-12 times the original width. Alternatively, lateral stretching ratios may be 8-10 times the original width.

The concluding portion of the lateral stretching phase includes an annealing section 46, such as an oven housing, where the film is heated at a temperature within the range of 130-170° C. for a suitable period of time, about 1-10 seconds. The annealing time helps control certain properties, and increased annealing can be used specifically to reduce shrinkage. The biaxially-oriented film is then withdrawn from the tenter frame and may be passed over a chill roller 48 where it is reduced to a temperature of less than about 50° C. and then applied to take-up spools on a take-up mechanism 50.

From the foregoing description, it will be recognized that the initial orientation in the machine direction is carried out at a somewhat lower temperature than the orientation in the lateral dimension. For example, the film exiting the preheat rollers is stretched in the machine direction at a temperature of about 120° C. The film may be cooled to a temperature of about 50° C. and thereafter heated to a temperature of about 160° C. before it is subject to the progressive lateral dimension orientation in the tenter section. It should be noted that roller speeds given may not necessarily reflect those in commercial production, where roller speeds as high as 900-1200 feet per minute may be used.

From the foregoing description it will be recognized that biaxially-oriented film can have a number of properties to its advantage during and after the machine processing steps. A relatively low coefficient of function is desirable, both during the biaxial orientation procedure and in the end use applications of the ultimately-produced biaxially-oriented film. A relatively high stiffness, as indicated by the tensile modulus in both the machine direction and the transverse direction is usually advantageous. Relatively low permeabilities to gas and water are desirable in many applications. In addition, a high shrinkage factor of the processed film, while undesirable in some cases, can be advantageous in other applications, such as where the film is used in overwrap packaging of food products, electrical components, and the like. As described in the previously referenced Canadian Patent Application No. 2,178,104, biaxially-oriented polypropylene films may be formed from propylene polymers prepared in the presence of catalysts incorporating heavily substituted bis-indenyl ligand structures. As described in the Canadian application, the polymers used have a very narrow molecular weight distribution, such as less than three, and well-defined uniform melting points. In each case the ligand structures are substituted on both the cyclopentyl portion of the indenyl structure (at the 2 position), and also on the aromatic portion of the indenyl structure. The tri-substituted structures are useful and less relatively bulky substituents are used in the case of 2-methyl, 4-phenyl substituted ligand or the 2-ethyl, 4-phenyl substituted ligands.

The present invention employs a polypropylene produced by an isospecific metallocene based upon an indenyl structure that is mono-substituted at the proximal position and otherwise unsubstituted. The metallocene catalyst may be characterized by the formula:

$$\text{rac-R'R''Si(2-RiInd)}_2\text{MeQ}_2 \qquad (6)$$

In Formula (6), R', R" are each independently a $C_1$-$C_4$ alkyl group or a phenyl group; Ind is an indenyl group substituted at the proximal position by the substituent Ri and otherwise unsubstituted; Ri is an ethyl, methyl, isopropyl, or tertiary butyl group, Me is a transition metal selected from the group consisting of titanium, zirconium, hafnium, vanadium; and each Q is independently a hydrocarbyl group or containing 1 to 4 carbon atoms or halogen.

As stated previously, the indenyl is mono-substituted at the proximal position and otherwise unsubstituted, with the exception that the indenyl group can be hydrogenated at the 4, 5, 6, and 7 positions. Thus, the ligand structure may be characterized by racemic silyl-bridged bis(2-alkylindenyl) or a 2-alkyl hydrogenated indenyl as indicated by the following structural formulas:

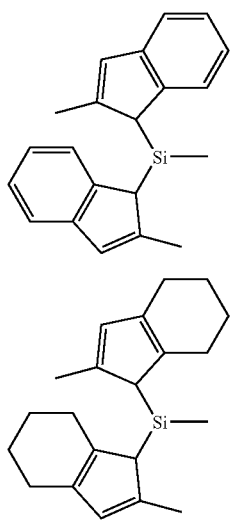

(7)

(8)

While, as described below, additional poly-substituted indenyl-based metallocenes may be employed in conjunction with the mono-substituted indenyl structure, at least 10 wt. % of the metallocene catalyst system should comprise the mono-substituted bis(indenyl) structure. Alternatively at least 25% or at least 50% of the catalyst system comprises the mono-substituted bis(indenyl)metallocene. The remainder of the catalyst system may include poly-substituted bridged indenyl-based metallocenes.

The polypropylene employed in the present invention is characterized in terms of a relatively broad melt temperature, with a melt flow from about 1 to 15 g/10 min with a more specific range of about 2 to 6 g/10 min. The polymer also has a very high isotacticity defined in terms of meso pentads and meso diads. The meso pentad content may be greater than about 96%, with a meso dyad content of greater than about 99%. The isotactic polymers produced with the metallocene catalysts of the present invention also have irregularities in the polymer structure characterized in terms of 2,1-insertions as contrasted with the predominate 1,2-insertions characteristic of isotactic polypropylene. The polymer chain of the isotactic polypropylene employed in the present invention are characterized by intermittent head to head insertions to result in a polymer structure as exemplified below.

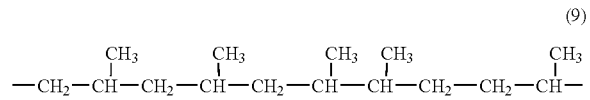

(9)

Without being limited to any one particular theory, as shown by the polymer structure depicted by formula (9), the occasional head-to-head insertion resulting from the use of the 2-alkyl substituted indenyl group results in adjacent pendant methyl groups separated by ethylene groups resulting in a polymer structure which behaves somewhat in the fashion of a random ethylene propylene copolymer and results in a broad range melting point. This results in a polymer which can be advantageously employed to produce a biaxially-oriented film having good characteristics in terms of strength in both the machine and transverse directions, low coefficients for friction, and relatively low permeabilities to water and to oxygen. The 2,1-insertions may range from about 0.1 to 1%. At the same time, the biaxially-oriented films thus produced have satisfactory haze properties, normally less than 1%, as measured by ASTM Standard D-1003, and good gloss characteristics, greater than 90%, as measured by ASTM Standard D-2457.

As indicated by formula (6) above, the silyl bridge can be substituted with various substituents in which R' and R" are each independently a methyl group, an ethyl group, a propyl group (including an isopropyl group), and a butyl group (including a tertiary butyl or an isobutyl group). Alternatively, one or both of R', R" can take the place of a phenyl group. Bridge structures for use in carrying out the present invention include dimethylsilyl, diethylsilyl, and diphenylsilyl structures.

The Ri substituent at the 2 position (the proximal position with regard to the bridge head carbon atom) can be a methyl, ethyl, isopropyl, or tertiary butyl. The substituent at the 2 position may be a methyl group. As noted previously the indenyl group is otherwise unsubstituted except that it may be a hydrogenated indenyl group. Specifically, the indenyl ligand may take the form of a 2-methyl indenyl or a 2-methyl tetrahydroindenyl ligand corresponding to structural formulas (7) and (8) above.

The ligand structure should be a racemic structure in order to provide the desired enantiomorphic site control mechanism to produce the isotactic polymer configuration. As noted previously, the mono-substituted indenyl ligand structures of the present invention may be used alone or in admixture with one or more poly-substituted bis(indenyl) ligands. Particularly useful di-substituted bis(indenyl)metallocenes which may be used in the present invention include those which are substituted at the 4-position as well as at the 2-position. The substituents at the 2-position on the indenyl group are as previously described. The substituents may be ethyl or methyl groups. The substituents at the 4 positions on the indenyl groups may be of greater bulk than the alkyl groups substituted at the 2-position and include phenyl, tolyl, as well as relatively bulky secondary and tertiary alkyl groups. As noted previously, the 4 substituent radicals normally have a higher molecular weight than the two substituent radicals. Thus, where the 2 substituent is a methyl or ethyl group, the substituents at the 4 position may take the form of isopropyl or tertiary butyl groups as well as aromatic groups. However, a di-substituted metallocene having an aryl group at the 4 position may be employed in combination with the mono-substituted indenyl groups, such as dimethylsilyl, bis (2-methylindenyl)zirconium dichloride. In combination with the dimethylsilyl bis(2-methylindenyl)zirconium dichloride may be a corresponding dimethylsilyl bis(2-methyl, 4-phenylindenyl)zirconium dichloride. Tri-substituted bis(indenyl) compounds may also be employed. Specifically, racemic dimethylsilyl bis(2-methyl, 4,6 diphenylindenyl)zirconium dichloride may be used in combination with the silyl bis(2-methylindenyl) derivative.

The metallocene or metallocene mixture catalyst systems employed in the present invention are used in combination with an alumoxane co-catalyst as will be understood by those skilled in the art. Methylalumoxane may be employed as a co-catalyst, but various other polymeric alumoxanes, such as ethylalumoxane and isobutylalumoxane, may be employed in lieu of or in conjunction with methylalumoxane. The use of such co-catalysts in metallocene-based catalyst systems are well-known in the art, as disclosed, for example, in U.S. Pat. No. 4,975,403 to Ewen, the entire disclosure of which is incorporated herein by reference. So-called alkylaluminum co-catalysts or scavengers may be employed in combination with the metallocene alumoxane catalyst systems Suitable alkylaluminum or alkylaluminum halides include trimethyl aluminum, triethylaluminium (TEAL), triisobutylaluminum (TIBAL), and tri-n-octylaluminum (TNOAL). Mixtures of such co-catalysts may also be employed in carrying out the present invention. While trialkylaluminums will usually be used as scavengers, it is to be recognized that alkylaluminum halides, such as diethylaluminum chloride, diethylaluminum bromide, and dimethylaluminum chloride, or dimethylaluminum bromide, may also be used in the practice of the present invention.

While the metallocene catalysts employed in the present invention can be used as homogeneous catalyst systems, they may also be used as supported catalysts. Supported catalyst systems are well-known in the alt as both conventional Zeigler-Natta and metallocene-type catalysts. Suitable supports for use in supporting metallocene catalysts are disclosed, for example, in U.S. Pat. No. 4,701,432 to Welborn, the entire disclosure of which is incorporated by reference, and include talc, an inorganic oxide, or a resinous support material such as a polyolefin. Specific inorganic oxides include silica and alumina, used alone or in combination with other inorganic oxides such as magnesia, titania, zirconia, and the like. Other support for metallocene catalysts are disclosed in U.S. Pat. No. 5,308,811 to Suga et al and U.S. Pat. No. 5,444,134 to Matsumoto, the entire disclosures of which are incorporated by reference. In both patents the supports are characterized as various high surface area inorganic oxides or clay-like materials. In the patent to Suga et al, the support materials are characterized as clay minerals, ion-exchanged layered compounds, diatomaceous earth, silicates, or zeolites. As explained in Suga, the high surface area support materials should have volumes of pores having a radii of at least 20 angstroms. Specifically disclosed in Suga are clay and clay minerals such as montmorillonite. The catalyst components in Suga are prepared by mixing the support material, the metallocene, and an organoaluminum compound such as triethylaluminum, trimethylaluminum, various alkylaluminum chlorides, alkoxides, or hydrides or an alumoxane such as methylalumoxane, ethylalumoxane, or the like. The three components may be mixed together in any orders or they may be simultaneously contacted. The patent to Matsumoto similarly discloses a supported catalyst in which the support may be provided by inorganic oxide carriers such as $SiO_2$, $Al_2O_3$, MgO, $ZrO_2$, $TiO_2$, $Fe_2O_3$, $B_2O_3$, CaO, ZnO, BaO, $ThO_2$ and mixtures thereof, such as silica alumina, zeolite, ferrite, and glass fibers. Other carriers include $MgCl_2$, Mg $(0-Et)_2$, and polymers such as polystyrene, polyethylene, polypropylene, substituted polystyrene and polyarylate, starches, and carbon. The carriers are described as having a surface area of 50-500 $m^2/g$ and a particle size of 20-100 microns. Supports such as those described above may be used, such as silica, having a surface area of about 300-800 $m^2/g$ and a particle size of about 5-50 microns. Where mixtures of metallocenes are employed in formulating the catalyst system, the support may be treated with an organoaluminum co-catalyst, such as TEAL or TIBAL, and then contacted with a hydrocarbon solution of the metallocenes followed by drying steps to remove the solvent to arrive at a dried particulate catalyst system. Alternatively, mixtures of separately supported metallocenes may be employed. Thus, where a mixture of metallocenes are employed, a first metallocene, such as racemic dimethylsilyl bis(2-methylindenyl)zirconium dichloride, may be supported on a first silica support. The second di-substituted metallocene, such as racemic dimethylsilyl bis(2-methyl, 4-phenylindenyl)zirconium dichloride, can be supported on a second support. The two quantities of separately supported metallocenes may then be mixed together to form a heterogeneous catalyst mixture which is employed in the polymerization reaction.

Without being limited by theory, the 2,1 insertions characteristic of the present invention produce "mistakes" in the polymer structure which impart the desired broad range melting characteristics of the present invention. The corresponding film is characterized in terms of low water and oxygen permeabilities and low coefficients of friction as described hereinafter. The "mistakes" due to the 2,1 insertions should not however be confused with mistakes resulting in racemic insertions as indicated, for example, by the following polymer structure:

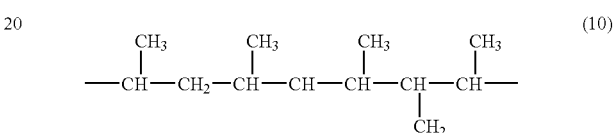

(10)

As will be recognized, the structure (10) can be indicated by the pentad mrrm. The "mistakes" corresponding to the head-to-head insertion mechanism involved in the present invention are not necessarily characterized by racemic diads.

In prior experimental work respecting the metallocene isotactic polypropylene, isotactic polypropylene having about 1% 2,1 insertions was employed in the production of a biaxially-oriented polypropylene film which was then compared with a similar biaxially-oriented film produced by catalysis with a standard Ziegler-Natta catalyst. The standard Ziegler-Natta catalyst employed in this work was a supported titanium tetrachloride supported on magnesium chloride. The metallocene catalyst employed in the experimental work was racemic dimethylsilyl bis(2-methylindenyl)zirconium dichloride supported on a silica support.

In the comparative experimental works, the two polypropylenes designated herein as Z-N iPP for the polypropylene produced by the more-or-less conventional Ziegler-Natta catalysts and miPP for the polypropylene produced employing a metallocene-based catalyst were subjected to biaxial orientation procedures employing a tenter frame process of the type described above with reference to FIG. 1. The orientation ratios were about 5:1 in the machine direction and about 8:1 in the transverse direction to produce a monolayer film having a gauge of about 18 microns. The processing was adjusted to produce clear films. The polymers used in the experimental work were generally characterized by the parameters shown in Table I:

TABLE I

|  | Z-N iPP | miPP |
|---|---|---|
| Melt Flow Rate, g/10 min | 2.8 | 2.5 |
| Xylene Solubles, wt. % | 3.9 | 0.2 |
| Die Swell Ratio | 2.5 | 1.7 |
| GPC, Polydispersity | 7 | 3 |
| DSC, Melt Pt., ° C. | 160 | 154 |
| dH, J/g | 90 | 87 |
| Recryst. Temp., ° C. | 107 | 107 |
| Xylene Insoluble NMR |  |  |
| meso pentad, % | 94.7 | 96.3 |
| meso dyad, % | 98.1 | 99.3 |

TABLE I-continued

|  | Z-N iPP | miPP |
|---|---|---|
| def/1000 | 9.4 | 3.5 |
| 2, 1 insertions, % | 0 | 1.0 |
| Injection Molding - | | |
| Tensile Modulus, MPa | 1275 | 1175 |
| Elongation @ Break, % | 230 | >500 |
| Flex Modulus, MPa | 1100 | 900 |

With reference to Table I, the melt flow rate was determined in accordance with ASTM Standard D-1238 at 230° C. using 2.16 kilograms of force. Melt flow rates for the metallocene isotactic polypropylene may vary from about 1 to 15 g/10 min, and alternatively from about 2 to 6 g/10 min. The tensile moduli and percent of elongation of break were determined in accordance with ASTM D-638 and the flex modulus in accordance with ASTM D-790. In oriented film processing, relatively narrow molecular weight distributions can be viewed as a potential shortcoming based on the consideration that a broader molecular weight distribution gives a broader operating window for the biaxially-oriented film processing system. Likewise, in trying to use random copolymers with lower melting points to improve the processing of Ziegler-based homopolymers, the properties of the resulting films could suffer and packaging line operations could be affected. Also, atactic polymer has been thought of as a lubricant for the stretching process, and the lack of it could make the polymer seem quite brittle in the tenter process. This is one explanation given for the poorer processing performance of high-crystallinity polypropylene based on Ziegler catalysts in conventional use.

The films produced employing the Ziegler-Natta isotactic polypropylene and the metallocene polypropylene were characterized in terms of their optical properties, strength, shrinkage, coefficient of friction, and permeabilities as described below in Table II. Table II presents the film properties for the Ziegler-Natta and the metallocene-based polymers in the first and second columns, respectively, with a relative qualitative indication of the differences between the two polymers in the last column. As will be recognized from a review of Table II, increases in the various parameters measured by the metallocene-based polypropylene over the Ziegler-Natta-based polypropylene are indicated by "+" and decreases in the parameters are indicated by the symbol "−." For the data presented in Table II, the percent haze and the gloss were determined in accordance with ASTM Standards D-1003 and ID-2457, respectively. The secant moduli and percent of elongation at break were determined in accordance with ASTM D-882. The percent shrinkage factors were determined at 127° C. in accordance with ASTM Standard D-1204, and the kinetic film-to-film coefficient of friction measurements were determined in accordance with ASTM D-1894. The water and oxygen permeabilities were determined in accordance with ASTM D-1249-90 and D-3985, respectively.

TABLE II

|  | Z-N iPP | miPP | Difference |
|---|---|---|---|
| Haze, % | <1 | <1 | |
| Gloss | >90 | >90 | |
| Secant Modulus, MPa | | | |
| MD | 1200 | 1500 | ++ |
| TD | 1900 | 2400 | ++ |

TABLE II-continued

|  | Z-N iPP | miPP | Difference |
|---|---|---|---|
| Elongation at Break, % | | | |
| MD | 150 | 120 | -- |
| TD | 50 | 40 | - |
| Shrinkage, % | | | |
| MD | 7 | 10 | + |
| TD | 10 | 20 | +++ |
| COF, kinetic, film-to-film | 0.6 | 0.4 | -- |
| WVTR, g/m²day/25 µm | 3.5 | 2.5 | --- |
| O₂TR, cc/m²day/25 µm | 2600 | 2200 | - |

There are, as indicated, some very unique film properties obtainable with this metallocene isotactic polypropylene. The stiffness and barrier are particularly good. These attributes make such films perform even better in allowing a longer shelf-life of the packaged food, or by handling better in packaging lines. A crisper film has the added aesthetic appeal of improved freshness and can allow a downgauging for environmental efforts in packaging reduction. Comparing fairly well to film properties from Ziegler-based high-crystallinity resins, these results show a potentially new route to crisper films—without the drawbacks of poor drawability shown with these other resins.

Figure 2:
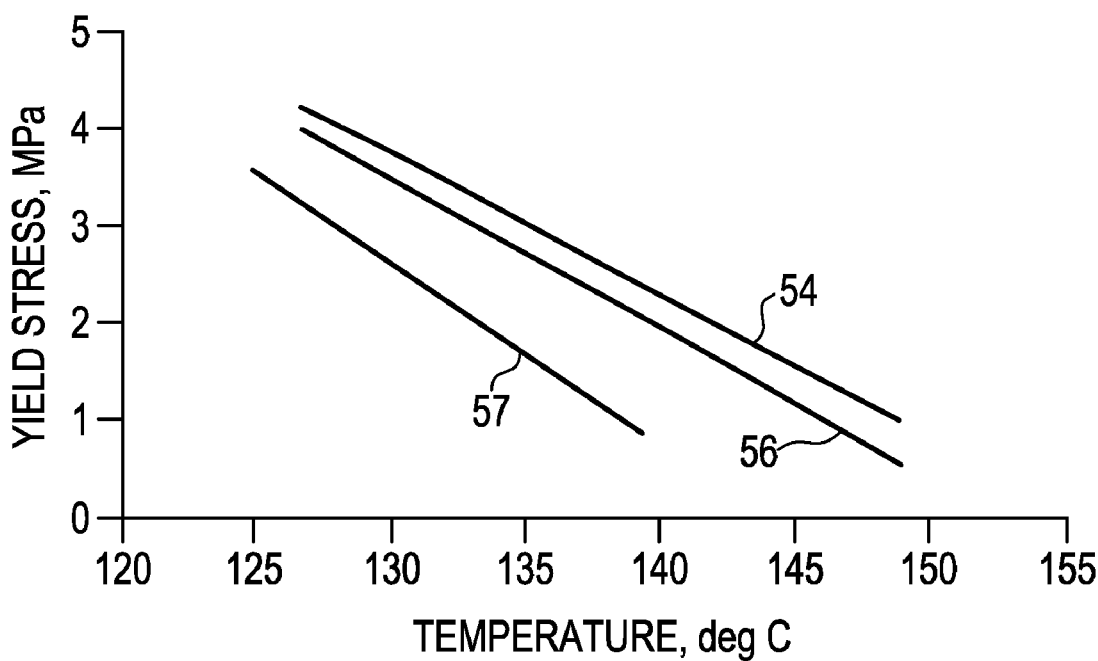
FIG. 2 is a graphical presentation of yield stress analysis illustrating biaxial stretching for polymer films employing isotactic polypropylenes produced by Ziegler-Natta catalysis and isotactic polypropylenes produced by metallocene catalysis.

The good processability is reflected in large part by the yield stress analysis presented in FIG. 2. As shown in FIG. 2, curves 54, 56, and 57 are graphs of yield stress in megapascals on the ordinate versus the temperature in degrees centigrade oil the abscissa. Curve 54 illustrates the results for the isotactic polypropylene produced by Ziegler-Natta catalysis as characterized in Tables I and II, and curve 56 illustrates the corresponding results for the polypropylene produced by metallocene catalysis as depicted in Tables I and II. Curve 57 shows the corresponding results for yet another polypropylene, in this case a propylene ethylene random copolymer containing less than 1% ethylene, produced by polymerization in the presence of an isospecific metallocene catalyst. Instead of having a sharp vertical correlation with temperature, the gradual slopes provide a wider range of temperatures over which the material may draw without creating high (or low) yield stresses and poor drawing performance. The yield stress is lower for the metallocene-based polypropylene at a given draw temperature. The metallocene-based polypropylene has a lower melting point which is associated with the 2,1 defects.

In addition, the high molecular weight of the metallocene-based isotactic polypropylene with 2,1 insertion defects, although narrow in MWD, also provides a benefit in the biaxial stretching process. The increased entanglements in these long chains are advantageous in holding the mass together during the crystalline and molecular rearrangements of orientation, while also producing significant orientation in the process—which is good for film properties.

Figure 3:
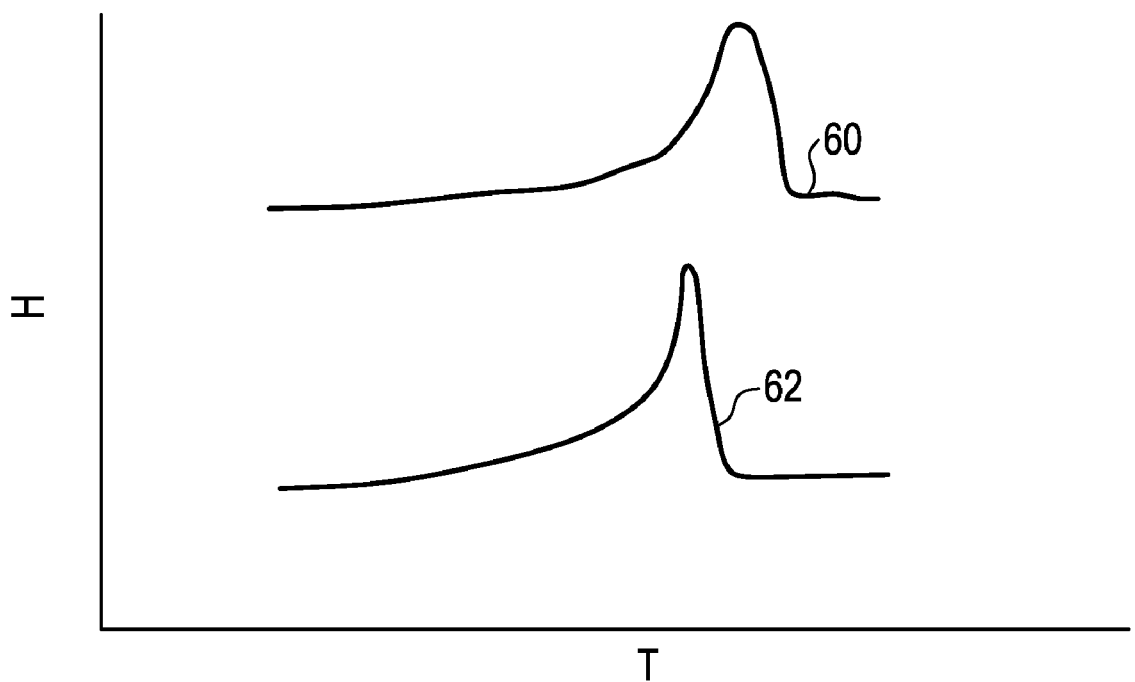
FIG. 3 is a comparative graphical presentation of differential scanning calorimeter endotherms for polypropylene produced employing a conventional Ziegler-Natta catalyst and polypropylene produced employing a metallocene catalyst.

A review of the melting curve for this material on the Differential Scanning Calorimeter shows a gradual melting onset, which represents a fairly wide melting range associated with the distribution of 2,1 insertion errors produced with this catalyst. This is illustrated in FIG. 3 which illustrates comparative results for the Ziegler-Natta catalyst-produced polypropylene and the metallocene-produced polypropylene of Tables I and II in which heat capacity in heat units per time H is plotted on the ordinate versus increasing temperature, T, on the abscissa, Curve 60 illustrates the graph of heat capacity versus temperature for the Ziegler-Natta-produced polypropylene and curve 62, the corresponding graph for the metallocene-catalyzed polypropylene. Like the stereoblock component in Ziegler-based IPP, this lower melting material may reduce the draw stresses required at the elevated temperature conditions in a tenter frame process.

The lack of atactic polymer structure, as indicated by low xylene soluble content) can also be related to the film properties achieved. The higher stereoregularity of the miPP, in general, makes it appear more like a higher crystallinity Ziegler-based product. The film's stiffness and barrier are directly related to the crystallinity and character of the amorphous regions in the final film. With a low atactic content, these regions may contain more definition or structure, with a greater number of chains containing some segmental crystallinity. This may directly affect permeation rates of small molecules trying to find their way through these regions in passing through the film. The lack of significant atactic structure also gives an explanation for the improved coefficient of friction performance. These "sticky" species have been considered a source of poor surface properties in some applications. Without these species to migrate or be squeezed to the surfaces of the miPP film, the coefficient of friction can be expected to be lower.

The shrinkage can be affected strongly by the process. The high molecular weight of the miPP is also expected to impact shrinkage, particularly in conceit with the process itself. Higher orientation temperatures can be expected to lower this value and may be another reason this data show the higher result. Tenter oven temperatures were run Oil the lower side of normal in making the comparisons given.

The improved characteristics of the polymer films associated with the isospecific metallocene catalysts, as demonstrated by the experimental work discussed above using films of conventional thickness, make it possible to provide thinner biaxially-oriented films that still provide the desired characteristics associated with thicker films. Conventional polypropylene films have generally exhibited thicknesses of greater than 10 microns. The improved processability with respect to the metallocene isotactic polypropylene allows the down-gauging of polypropylene films to thicknesses of 10 microns or less. The down-gauged films may have a thickness ranging from about 5 to 10 microns. Additionally, the metallocene isotactic polypropylene film's improved stiffness and low permeability allow the film to be used in product packaging where thicker films produced with conventional isotactic polypropylene are employed. It has been observed generally that decreases in both moisture vapor transmission and oxygen transmission have occurred with decreasing film gauge in metallocene isotactic polypropylene films, while conventional Ziegler-Natta polypropylene films showed increased transmission rates with decreased film gauge, as would be expected. The polypropylene films of the invention have a permeability to water vapor of less than about 2.5 g/m² day/25 μm and a permeability to $O_2$ of less than about 2200 cc/m² day/25 μm, The stiffness of the biaxially oriented films is measured by secant moduli in the longitudinal and transverse directions. The thin films of the present invention have a secant modulus greater than about 1400 MPa in the longitudinal direction and greater than about 2200 MPa in the transverse direction.

The films of the present invention may also be produced by the co-polymerization of propylene and ethylene in the presence of an isospecific metallocene catalyst. The polypropylene produced should have an ethylene content ranging from about 0 to 1% by weight of polymer. Comparable results are achieved with respect to these copolymers to those of the metallocene isotactic polypropylene homopolymers.

Having described specific embodiments of the present invention, it will be understood that modifications thereof may be suggested to those skilled in the all, and it is intended to cover all such modifications as fall within the scope of the appended claims.

The invention claimed is:

1. A method of producing a biaxially-oriented film comprising providing an isotactic propylene polymer prepared by polymerization of propylene in the presence of an isospecific metallocene catalyst characterized by the formula:

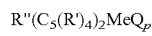

wherein each $(C_5(R')_4)$ is a substituted cyclopentadienyl ring, each R' is the same or different and is a hydrogen or hydrocarbyl radical having 1-20 carbon atoms, R" is a structural bridge between the two $(C_5(R')_4)$ rings imparting stereorigidity to the catalyst with the two $(C_5(R')_4)$ rings being in a racemic configuration relative to Me, and R" is selected from the group consisting of an alkylene radical having 1-4 carbon atoms, a silicon hydrocarbyl radical, a germanium hydrocarbyl radical, a phosphorus hydrocarbyl radical, a nitrogen hydrocarbyl radical, a boron hydrocarbyl radical, and an aluminum hydrocarbyl radical; Me is a group 4b, 5b or 6b metal as designated in the Periodic Table of Elements; each Q is a hydrocarbyl radical having 1-20 carbon atoms or is a halogen; and $0 \leq p \leq 3$;

(a) extruding the isotactic polypropylene into a sheet; and
(b) stressing the extruded sheet in the transverse and longitudinal directions to form a biaxially-oriented film having a thickness of 10 microns or less and a secant modulus in the longitudinal direction of greater than about 1400 MPa and a secant modulus in the transverse direction of greater than about 2200 MPa, the polymer film having a permeability to water vapor of less than about 2.5 g/m² day/25 μm and a permeability to $O_2$ of less than about 2200 cc/m² day/25 μm.

2. The method of claim 1 wherein the extruded sheet is stressed in the transverse direction at a draw ratio of at least 6:1 and in the longitudinal direction at a draw ratio of at least 4:1.

3. The method of claim 1 wherein the isotactic polypropylene has a meso pentad content of greater than about 96%.

4. The method of claim 1 wherein isotactic polypropylene has 2,1-insertions of between about 0.1 to 1%.

5. The method of claim 1 wherein the isotactic polypropylene has a melt flow rate of between about 1 to 15 g/10 min.

6. The method of claim 1 wherein the isotactic polypropylene having a xylene solubles in the amount of between about 0.1 to 1% by weight of polypropylene.

7. The method of claim 1 wherein the isotactic polypropylene is extruded into a sheet having a thickness from about 160 to 400 microns.

8. The method of claim 1 wherein Me is selected from a group consisting of titanium, zirconium, hafnium and vanadium.

* * * * *